Oct. 8, 1963   J. A. SENN   3,106,110
PRECISION POWER CLAMP
Filed July 15, 1959   3 Sheets-Sheet 1
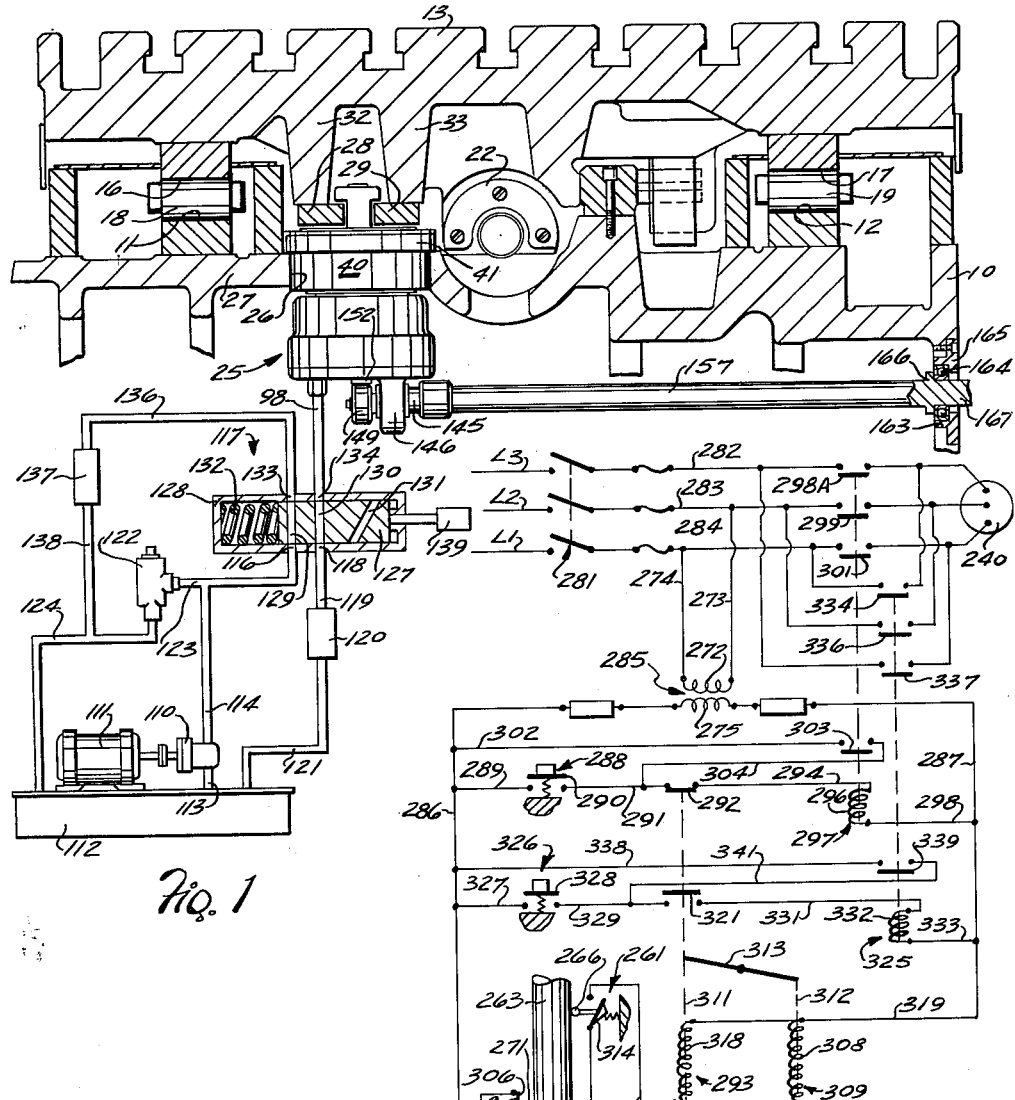
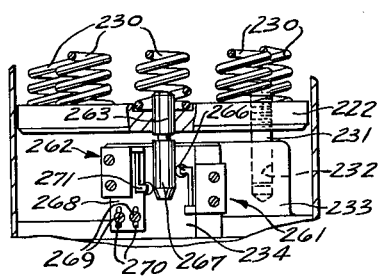
INVENTOR.
Jurg A. Senn
BY
Elroy J. Wutschel
Attorney Oct. 8, 1963 J. A. SENN 3,106,110
PRECISION POWER CLAMP
Filed July 15, 1959 3 Sheets-Sheet 2
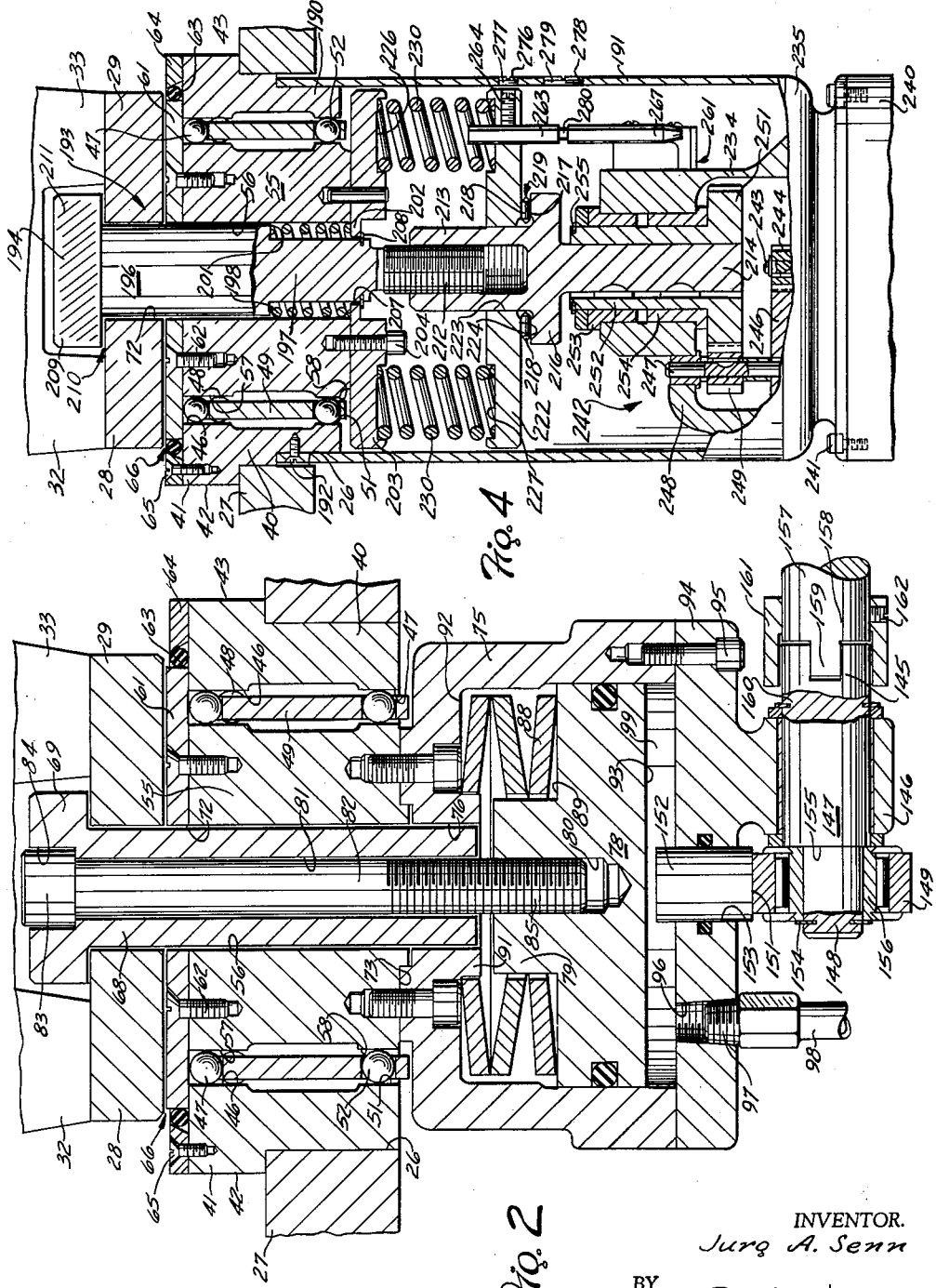
INVENTOR.
Jurg A. Senn
BY
Leroy J. Wutschel
Attorney

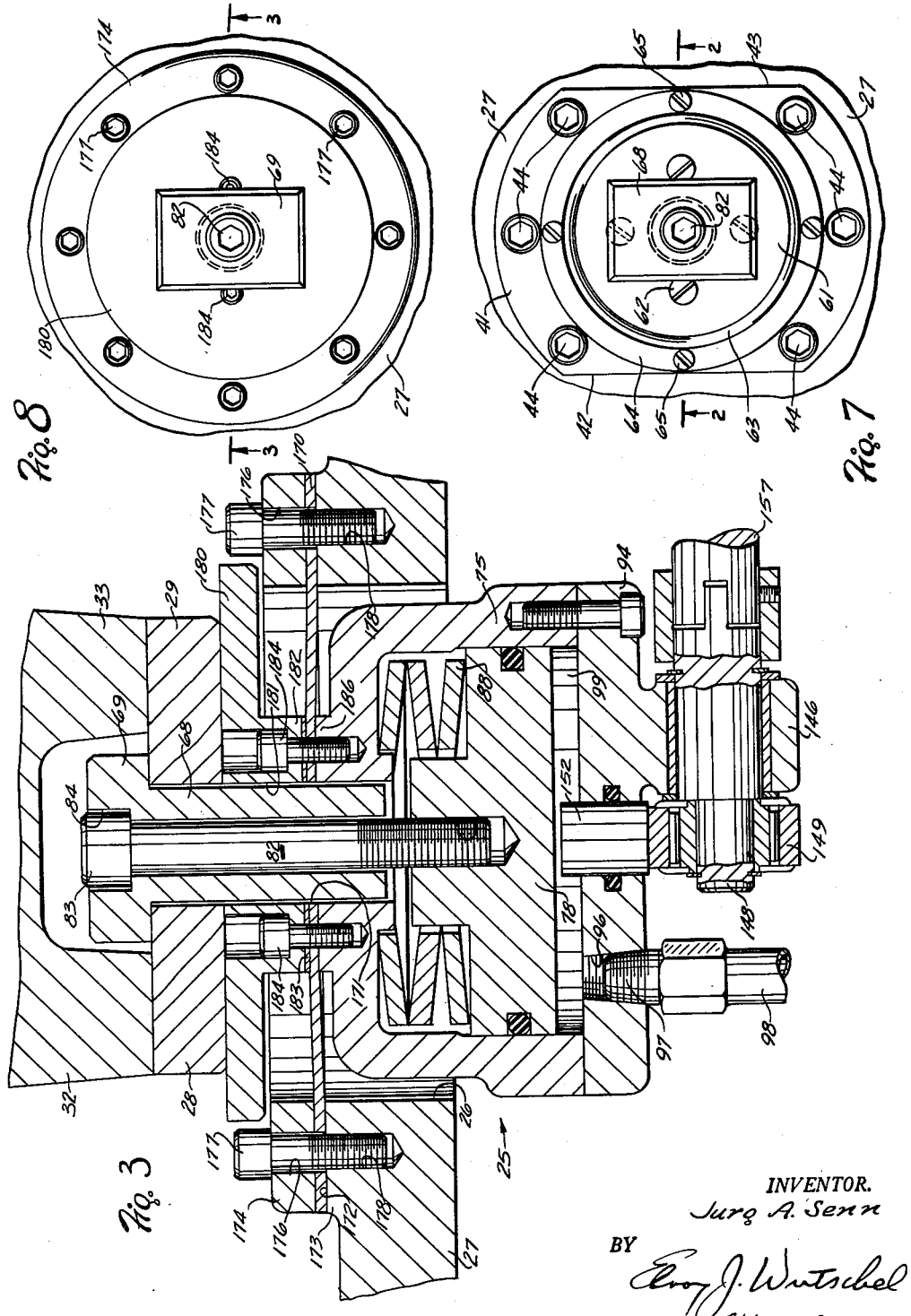

United States Patent Office 3,106,110
Patented Oct. 8, 1963

3,106,110
PRECISION POWER CLAMP
Jurg A. Senn, Knoxville, Tenn., assignor to Kearney & Trecker Corporation, West Allis, Wis., a corporation of Wisconsin
Filed July 15, 1959, Ser. No. 827,348
16 Claims. (Cl. 77—4)

This invention relates to a precision machine tool having a movable member supported for movement on rollers and more particularly to an improved precision carriage clamping mechanism.

In precision machine tools such as jig boring machines having a member which is supported for movement, as by rollers, the rolling contact renders the movable member of the machine tool exceptionally sensitive to forces which tend to move it from a precisely orientated position. Therefore, the clamping mechanism provided must be effectvie to render the movable member completely immovable in all directions but in operating must not impose forces on the precision roller supporting structure which would tend to disturb its positional geometry. It is also highly desirable, especially with precision machine tools, that the clamping mechanism be capable of being adjusted to exert a predetermined clamping force so that the determination of the clamping force necessary for clamping the movable member in position is not dependent upon the judgment of the operator of the machine. The clamping mechanism provided should also be self locking upon failure of the power system and remain so until released.

It is therefore a primary object of the present invention to provide an improved high precision power clamp for effecting precision clamping of a movable member of a machine tool.

Another object of the present invention is to provide an improved power clamp for clamping a roller supported member of a machine tool in the precise position at which the member was brought to rest to render the movable member completely immovable in any direction.

Still another object of the present invention is to provide a high precision power clamp which when actuated automatically operates to apply a clamping force of predetermined value to a movable member.

A further object of the present invention is to provide a high precision power clamp which is predeterminately adjustable to effect a specific clamping force and which is automatically operable to effect the desired constant clamping force.

A further object of the present invention is to provide a precision power clamp operable to apply a predetermined constant clamping force and which is not dependent upon an operator's judgement for operation.

A further object of the present invention is to provide a high precision power clamp which is automatic in operation and has incorporated manual operable structure for rendering the clamp inoperative.

An additional object of the present invention is to provide a high precision power clamp of simple but sturdy construction and efficient in operation.

According to this invention an improved precision clamp mechanism is provided having two axially movable force applying members which are operably urged to engage a pair of horizontally disposed clamp rails carried by a member disposed for movement on a supporting structure. The two force applying members are operable to engage the clamp rails of the movable member in opposing relationship, and with equal magnitude. The force applying members when engaged with the movable member to immobilize it do not operate to impart to the movable member a downwardly acting force which would tend to clamp the movable member to its support on the supporting structure. Thus, the movable member, when immobilized, is not forcefully engaged on the supporting structure and, therefore, no imposed forces are imparted to the support which would tend to deform it or impair its operation. The stability and accuracy of the geometry of the machine structure is never affected by the operation of the improved clamp mechanism which makes it particularly suitable for extremely precise machine tools. The force applying members are laterally immovable in all directions relative to the structure on which the movable member is disposed and thereby act only in a plane perpendicular to the path of travel of the movable member. Thus, the improved clamp mechanism is incapable of applying any forces to the movable member which would tend to displace it from its exact position. The force applying members are actuated by resilient means which is operatively disposed so as to be capable of being selectively preloaded to a desired value to render the precision clamp mechanism adjustable for applying a predetermined calculated force to the movable member. In operation, the precision clamp mechanism has two conditions of operation, either fully clamped or fully unclamped. Thus, the problem of whether to apply more or less force to effect a clamping of the movable member is entirely eliminated and the clamping force applied by the clamp mechanism will be in accordance with values predetermined from engineering calculations. To release the axial movable force applying members from engagement with the movable member power means are provided which when actuated are operable to act upon the resilient means rendering the resilient means inoperable and to move the two force applying members axially out of clamping engagement with the movable member.

The foregoing and other objects of this invention, which will become more fully apparent from the following detailed description, may be achieved by means of the exemplifying apparatus depicted in, and set forth in this specification in connection with the accompanying drawing, in which:

FIGURE 1 is a detail transverse fragmentary view in vertical section of a table and supporting bed of a precision machine tool in which the present invention is incorporated and including a diagrammatic representation of a hydraulic circuit for actuating the precision power clamp;

FIG. 2 is an enlarged detail view in vertical section of the precision power clamp taken in a plane represented by the line 2—2 in FIG. 7;

FIG. 3 is an enlarged detail view in vertical section of a modified form of the apparatus of FIG. 2, showing a diaphragm mounting for effecting radial immobilization of the clamp apparatus;

FIG. 4 is an enlarged detail view in vertical section of another modified form of the invention adapted to be actuated by an electric motor;

FIG. 5 is a detail fragmentary view in vertical elevation as viewed from the right of FIG. 3, showing the arrangement of the switches which are actuated by the switch actuating rod carried by the spring plate;

FIG. 6 is a schematic representation of the electrical circuit employed with the modified form of the invention of FIG. 4;

FIG. 7 is a plan view of the precision power clamp illustrated in FIG. 1; and,

FIG. 8 is a plan view of the clamp mechanism employing the diaphragm mounting arrangement.

Referring more specifically to the drawings and particularly to FIG. 1 thereof, the invention is shown embodied in a high precision machine tool, such as a jig boring machine. As shown, the reference numeral 10 indicates the bed of the machine having a pair of longitudinally extending roller supporting surfaces 11 and 12.

A work supporting table 13 is supported on the bed 10 for longitudinal reciprocatory movement and is provided with a pair of longitudinally extending roller engaging surfaces 16 and 17. A pair of roller support mechanisms 18 and 19 are disposed on the roller surfaces 11 and 12 of the bed 10 and are adapted to be engaged by the roller engaging surfaces 16 and 17 of the table 13 so that the table 13 is supported by the rollers for longitudinal movement along the bed 10. Reciprocatory movement of the table 13 is effected by means of a screw and nut mechanism 22, in a well known manner.

Clamping of the table 13 in any desired position is effected through a high precision power clamp, generally indicated by the reference numeral 25. The clamp 25 is supported in fixed position in the bed 10 in a circular opening 26 provided in a horizontal top plate 27 of the bed 10. As shown in FIGS. 1 and 2, the precision clamp 25 is disposed to impart table immobilizing forces to a pair of longitudinal parallel spaced apart clamp rails 28 and 29 which are secured to the table 13. The rails 28 and 29 are fixedly secured as by screws (not shown) to the bottom surfaces of a pair of longitudinal depending web members 32 and 33 integrally formed with the table 13.

The high precision power clamp 25 is operable to impart the immobilizing force to the table 13 without applying the clamping forces upon the supporting roller mechanisms 18 and 19. As shown in FIG. 2, immobilization of the table 13 is effected by means of the clamp 25 which includes an annular bearing mounting ring 40 carried within the opening 26 provided in the top plate 27 of the bed 10. The bearing mounting ring 40 is provided with a flange 41 which is trimmed to form sides 42 and 43, as illustrated in FIG. 7 to fit into the limited space provided by the particular bed and table construction shown in FIG. 1. The flange 41 overlies the plate 27 about the opening 26 to support the ring 40 which depends therefrom. A plurality of screws 44 extend through the flange 41 and into threaded engagement with the plate 27 of the bed 10 to secure the mounting ring 40 to the bed 10 within the opening 26. The annular bearing mounting ring 40 is provided with a top annular bearing surface 46 which is engaged by the bearing balls of two annular rows of bearings 47 and 48 of a bearing structure 49. The bearing mounting ring 40 is also provided with a bottom annular bearing surface 51 which is engaged by the bearing balls 52 of a bottom annular bearing row of the bearing structure 49.

A clamp plunger 55 having an axial bore 56 is mounted in axial alignment within the bore of the bearing mounting ring 40 and is provided with top annular bearing surface 57 which is complementary to the surface 46 of the ring 40, and a bottom bearing surface 58 which is complementary to the bearing surface 51 of the ring 40. The bearing surface 57 defines a circle which is concentric with the circle defined by the bearing surface 46 and its diameter is appreciably smaller than the circle formed by the bearing surface 46 to form an annular space between the two bearing surfaces for receiving the bearing balls 47 and 48. The distance between the bearing surfaces 46 and 57 is slightly less than the diameter of the bearing balls 47 and 48 so that the bearing balls must be forced into the annular space to preload them. In like manner the cross sectional width of the annular space between the bearing surfaces 51 and 58 is slightly less than the diameter of the bearing balls 52 for the purpose of preloading the latter. The construction and arrangement is such that the preloading force effected on the bearing balls, will be greater than the maximum immobilizing forces to be imparted to the table by the clamp. Thus, with the bearing balls of each annular bearing row preloaded and the mounting ring 40 fixedly secured to the bed 10, the plunger 55 will be radially constrained from radial movement without interfering with its axial movement.

An annular plunger clamp plate 61 is secured to the top of the plunger 55 by a plurality of screws 62 so that it will move axially with the plunger 55. The plate 61 extends radially beyond the periphery of the plunger 55 to overlie the inner diameter of the mounting ring 40 and cover the annular space between the bearing surfaces 46 and 57. An O-ring 63 is provided to prevent oil, dirt and the like from entering into the bearing structure 49. The O-ring 63 is mounted about the periphery of the clamp plate 61 and is held in position on the top surface of the bearing mounting ring 40 by means of a retainer ring 64 secured to the bearing mounting ring by screws 65. The arrangement and construction of the apparatus thus far described is such that a slight clearance space 66 is provided between the top surface of the clamp plate 61 and the bottom surfaces of the clamp rails 28 and 29 whenever the clamp mechanism 40 is in a released condition, as will be more fully described.

The T-bolt 68 having a flanged head 69 thereof is disposed in the T-slot formed by the clamp rails 28 and 29 so as to be engageable with the top surfaces of the clamp rails 28 and 29. The T-bolt 68 extends downwardly between the rails, through an axial opening 72 provided in the clamp plate 61 and through the bore 56 of the plunger 55 to extend below the bottom surface 73 of the plunger and is of a diameter to provide a sliding fit with its associated members. A cylinder 75 is secured to the bottom surface 73 of the plunger 55 and its upper end is provided with an axial opening 76 for receiving the lower end of the T-bolt 68. A piston 78 is mounted in the cylinder 75 for reciprocatory movement and is provided with an upwardly extending axial boss 79 that has a threaded axial opening 80. The T-bolt 68 is provided with a concentric bore 81 through which a tie bolt or coupling 82 extends. The tie bolt 82 has a head 83 which is seated in a counterbore 84 provided in the flanged head 69 of the T-bolt 68. A threaded end 85 of the tie bolt 82 extends downwardly into engagement with the threaded opening 80 of the piston 78 to thus effectively couple the T-bolt 68 to the piston 78.

A resilient member 88, which in a preferred form is of the type commonly known as a "Belleville" spring, is loosely mounted about the boss 79 of the piston and seated on an annular surface 89 provided on the piston 78. The upper end of the resilient member 88 encircles an inwardly extending collar 91. The Belleville spring 88 is compressed between an end surface 92 of the cylinder 75 and the piston 78 by threading the tie bolt 82 inwardly into the threaded opening 80 of the piston 78. Thus, by adjusting the tie bolt 82 the resilient member may be placed under any desired predetermined amount of compression. It is apparent, therefore, that the resilient member 88 will act to urge the piston 78 downwardly relative to its associated cylinder 75. In being urged downwardly the piston 78 will act through the tie bolt 82 to draw the T-bolt 68 downwardly to thereby engage its flanged head 69 firmly against the top surfaces of the clamp rails 28 and 29. As soon as the flanged head 69 of the T-bolt 68 engages the clamp rails 28 and 29 a resisting force will be developed which tends to prevent the piston 78 from moving downwardly relative to its associated cylinder 75. Thereupon, the force developed by the resilient member 88 will be transmitted to the cylinder 75 to urge it in an upward direction relative to the piston 78.

As the cylinder 75 tends to move upwardly it will move the plunger 55 and its associated clamp plate 61 upwardly to firmly engage the top surface of the clamp plate against the bottom surfaces of the clamp rails 28 and 29. Thus, two forces of the same magnitude are applied to the clamp rails 28 and 29 from opposite directions to thereby lock the movable member in the preselected position. It is also apparent that while the two forces that are applied to the clamp rails are of equal magnitude, the force that is applied through the plunger 55 will act on a greater area and thus resist any tendency of the movable member to be displaced downwardlly. In this manner the movable member is effectively immobilized, but the immobilizing forces applied do not act to draw the movable member down upon the sensitive roller supporting mechanisms 18 and 19. The forces acting on the clamp rails 28 and 29, to immobilize the movable member, will be distributed radially into the bed structure through the plunger 55, the annular rows of bearings 47, 48 and 52, and the bearing mounting ring 40. Since the annular rows of bearings 47, 48 and 52 are preloaded under a force which is greater than the maximum clamping force to be applied, the plunger 55 is radially constrained and cannot move radially in any direction. Therefore, the clamp mechanism, in acting on the movable member, will not impart any forces to the movable member which would tend to displace it from its orientated position. This factor is particularly important when applied to high precision machine tools, such as jig borers, because in these types of machine tools displacement of a movable member, such as the work supporting table 13, as little as .00005 inch may be intolerable inasmuch as the machines may be required to be accurate within 0.0001 inch or less. Thus, the accuracy of the clamp mechanism employed with these high precision machine tools is of the utmost importance and contributes substantially to the overall accuracy obtainable from such machine tools.

The present invention has been designed to be normally acting by operation of the spring 88 to effect immobilization of the movable member when the latter is at rest. Thus, whenever it is desired to move the movable member, the clamp 25 must be actuated to effect a release of the immobilizing forces imparted to the table 13. To this end, an end cover plate 94 is provided to seal the open end of the cylinder 75 and is secured in position by means of screws 95. The end plate 94 is provided with a threaded opening 96 for receiving a fitting 97 which connects a hydraulic pressure line 98 to the cylinder 75. Thus, hydraulic pressure is directed through the line 98 to a chamber 99 formed by the head end surface 93 of the piston 78 and the end plate 94 and the hydraulic pressure acts upon the piston to urge it in an upwardly direction relative to the associated cylinder 75. Upon being urged upwardly the piston 75 will effect a release of the T-bolt 68 from the rails 28 and 29. Simultaneously, the hydraulic pressure in the chamber 99 will also act upon the end plate 94 to urge the cylinder 75 downwardly relative to the piston 78. In moving downwardly the cylinder 75 will move the plunger 55 axially in the same direction to shift the clamp plate 61 out of engagement with the clamp rails 28 and 29. Thus, the immobilizing forces applied to the rails 28 and 29 is released to free the table 13 for movement. When hydraulic pressure to the chamber 99 is discontinued, the compressed resilient member 88 will be free to act on both the piston 78 and the cylinder 75 to reapply the immobilizing forces to the rails 28 and 29.

The hydraulic circuit employed to supply hydraulic pressure to the clamp mechanism 25 is diagrammatically shown in FIG. 1. As shown, a fixed displacement constant delivery pump 110 is adapted to be driven by an electric motor 111 to draw hydraulic fluid from a reservoir 112 through an inlet conduit 113 and discharges fluid under pressure into a delivery conduit 114 connected to an inlet port 116 of a four way valve 117. An exhaust port 118 of the valve 117 is connected to the reservoir by a conduit 119, a check valve 120 and a return conduit 121. A pressure relief valve 122 which determines the maximum operating pressure of the system is connected to the delivery conduit 114 by means of a branch conduit 123 and returns excess fluid to the reservoir 112 by means of an exhaust conduit 124.

The four way valve 117 has a plunger 127 reciprocally supported within the cylinder 128 of the valve. The plunger 127 is provided with three passages 129, 130 and 131 which serve to selectively pass fluid through the valve. The plunger 127 is normally biased by means of a spring 132 to a rightward position, as shown in FIG. 1, and in this position serves to align the passage 129 with the inlet port 116 and an outlet 133 in the cylinder 128; and the passage 130 with the exhaust port 118 and a supply port 134 which has the opposite end of the conduit 98 connected thereto. Thus, with the valve 117 in its normal position, fluid pressure supplied by the pump 113 to the supply conduit 114 will flow through the valve 117 via the port 116, the passage 129 and the port 133 into a reservoir return circuit comprising a conduit 136, a check valve 137 and a conduit 138 connected to the return conduit 124. At this time the chamber 99 of the clamp mechanism 25 will be vented to the reservoir by means of the conduit 98, the port 134, the passage 130 in the plunger 127, the port 118, the conduit 119, the check valve 120 and the return conduit 121.

When it is desired to effect a release of the immobilizing forces applied to the table 13 by the clamp mechanism 25, it is necessary to overcome the forces applied by the spring 88. To this end, a switch (not shown) will be actuated to effect energization of a solenoid 139 operably connected in a well known manner to move the plunger 127 of the valve 117 to a leftward position. With the plunger 127 of the valve 117 in a leftward position, fluid pressure in the supply conduit 114 will flow through the valve 117 via the port 116, the passage 131 in the plunger 127 and the port 134 into the conduit 98 and thence into the chamber 99. If the fluid pressure supplied to the chamber 99 exceeds the maximum operating pressure the excess fluid will be returned to the reservoir 112 via the branch conduit 123, the pressure relief valve 122 and the return conduit 124.

Manual actuating means have also been provided to effect a release of the clamping action of the clamp mechanism 25. To this end, an actuating shaft 145 is journalled in a depending bearing support 146 integrally formed with the end plate 94. An end 147 of the shaft 145 is formed with a crank extension 148, the axis of which is parallel to but offset from the axis of the shaft 145. The arrangement is such that upon rotation of the shaft 145 the axis of the crank extension will rotate about the axis of the shaft 145. The crank extension 148 has mounted on it a pin type cam follower bearing 149 which engages the outer end 151 of a piston elevating plunger 152 slidably mounted in an axial opening 153 in the end plate 94. The bearing 149 is secured on the crank extension 148 and against a shoulder 155 formed by the crank extension and the shaft by means of a snap ring 154 to thereby confine the stationary inner race 156 of the bearing against the shoulder 155 and the snap ring 154.

In operation, when no fluid pressure is supplied to the chamber 99 of the cylinder 75, rotation of the shaft 145 through an arc of 180° will serve to rotate the axis of crank extension 148 about the axis of the shaft 145 and into a plane which is above the plane of the axis of the shaft 145. In doing so, the bearing 149 will elevate the plunger 152 into engagement with the surface 93 of the piston 78 to move the piston upwardly against the pressure of the spring 88 to thereby effect a release of the immobilizing forces that are applied to the table 13 by the clamp mechanism 25 in the same manner as is effected by supplying fluid pressure to the chamber 99.

It should be noted that the clamp mechanism 25 is operable to impart full forces to the table 13 and never partial forces. Thus, once the desired forces to be applied are determined by engineering calculations, and the tie bolt 82 adjusted relative to the piston 78 so as to effect the desired calculated clamping force, the operation of the clamp mechanism is entirely automatic. Either it is fully on or fully off, there is no intermediate position, and the problem of whether to apply more or less force is entirely eliminated.

To effect rotation of the shaft 145 externally of the bed 10, a shaft extension 157 has been provided. The shaft extension 157, is provided with bifurcated inner end 158 which engages a tongue 159 provided on the end 160 of the shaft 145. A sleeve 161 engaged about the ends 160 and 158 of the shaft 145 and shaft extension 157, respectively, maintains the two ends together, with the sleeve 161 being held in position by means of a set screw 162. The shaft extension 157 extends outwardly of the bed 10 through an opening 163, as shown in FIG. 1, and is journalled in a bearing 164 carried in a bearing support 165 mounted within the opening 163. A collar 166 provided on the shaft extension 157 abuts the inner race of the bearing 164 and serves to prevent the shaft extension 157 from moving axially. The outwardly extending end 167 of the shaft extension 157 is formed with a squared end (not shown) which receives a suitable crank or actuating means (not shown) by which means rotation of the shaft 145 in either direction may be accomplished.

A modified version of the invention is shown in FIG. 3. In this case, a simplified mounting arrangement for securing the clamp mechanism 25 within the opening 26 is provided on the top plate 27 of the bed 10. As shown in FIG. 3, a circular steel diaphragm plate 170 having an axial opening 171 is secured to the top plate 27 of the bed 10. The diaphragm 170 is clamped in position on a finished surface 172 of a boss 173 by means of a clamp ring 174 having a plurality of spaced openings 176 through which screws 177 are inserted into threaded engagement with complementary threaded openings 178 provided in the top plate 27 of the bed 10. The axial opening 171 of the diaphragm 170 is disposed so that its axis coincides with the axis of the opening 26.

A circular clamp plate 180 having a depending hub 182 provided with an axial opening 181 is disposed on the diaphragm 170 with the axis of the opening 181 coinciding with the axis of the opening 171 provided in the diaphragm 170. To enable the clamp plate 180 to move a predetermined distance relative to the rails 28 and 29 a spacer washer 183 is interposed between the hub 182 and the diaphragm 170. Thus, when the clamp mechanism 25 is in an unclamped condition a predetermined clearance will be established between the bottom surfaces of the rails 28 and 29 and the top surface of the clamp plate 180.

As shown in FIG. 3, the cylinder 75 abuts the bottom surface of the diaphragm 170 and is positioned so that its axis coincides with the axis of the diaphragm 170 and the axis of the clamp plate 180. The cylinder 75 is secured to the diaphragm 170 and the clamp plate 180 by means of a plurality of cap screws 184, two of which are shown in FIGS. 3 and 8. The screws 184 are located in spaced relationship in an annular row about the opening 181 and extend through complementary suitable openings provided in the diaphragm 170 into threaded engagement with axially aligned threaded openings provided in a boss 186 formed on the cylinder 75. Thus, the clamp ring 174 and the cylinder 75 are rigidly secured in axially aligned position to the diaphragm 170 to obtain maximum radial rigidity for the clamp mechanism while at the same time permitting axial movement of the cylinder 75 with the deflection of the diaphragm 170.

The T-bolt 68 with the axially aligned tie bolt 82 is inserted between the rails 28 and 29 and through the axially aligned openings in the clamp plate 180, the diaphragm 170 and the cylinder 75 to couple the T-bolt 68 and the piston 78 by reason of the threaded engagement of the tie bolt 82 with the piston 78.

The modified structure, shown in FIG. 3, functions in the same manner as does the clamp mechanism, shown in FIG. 2. That is, the clamp mechanism is normally acting to impart immobilizing forces to both sides of the clamp rails 28 and 29. The Belleville spring or resilient member 88 which is under predetermined compression by reason of the threaded engagement of the tie bolt 82 and the piston 78 acts to firmly engage the flanged head 69 of the T-bolt 68 with the top surfaces of the clamp rails. The resilient member 88 also acts to move the cylinder 75 in an upwardly direction relative to the piston 78 and in doing so tends to deflect the diaphragm upwardly, as shown in FIG. 3. The upwardly acting force will move the clamp plate 180 upwardly to firmly engage the top surface of the clamp plate 180 with the bottom surfaces of the rails 28 and 29. The opposing forces applied by the clamp mechanism will thereby lock the movable member in a predetermined orientated position.

To effect a release of the immobilizing forces obtained through the normal action of the clamp mechanism, fluid pressure is supplied to the chamber 99, as previously described. With fluid pressure supplied to the chamber 99 the piston 78 will tend to move upwardly relative to the associated cylinder 75 effecting a release of the T-bolt 68 from the rails 28 and 29. Simultaneously, the fluid pressure will act upon the end plate 94 of the cylinder 75 to force it in a downward direction relative to the piston 78. In moving downwardly the cylinder 75 will draw the deflected diaphragm 170 and the clamp plate 180 with it until the clamp plate engages the retainer ring 17, which serves as a positive stop for this action. Operating the clamp mechanism, shown in FIG. 3, in a releasing action, will effect a spacing of the clamp plate 180 downwardly from the rails 28 and 29 to create a clearance space therebetween. The width of the clearance space between the clamp plate 180 and the rails 28 and 29 may be varied as desired by changing the thickness of the spacer washer 183 as desired. The thickness of the diaphragm will be such as to provide for maximum axial deflection and greatest radial rigidity of the clamp mechanism.

It is apparent that with either version of the precision power clamp thus far described, a movable member of a machine tool can be immobilized with the application of pre-selected calculated forces required for a particular operation or condition. With either of the versions set forth a high degree of stability is obtained for the clamp mechanism which in operation will not impart to the movable member that it is associated with, any forces which would tend to displace the movable member from its predetermined orientated position. It is also apparent that with either version of the clamp mechanism the immobilizing forces are applied to the movable member and these forces are distributed radially through the bed structure and a downward force is not imposed upon the roller supporting members. Thus, either the roller supports 18 and 19 nor the roller ways 11 and 12 of the bed 10 nor the roller ways 16 and 17 of the table 13 are subjected to external forces which tend to deform them or subject them to abnormal wear when the clamping action is applied.

The two versions of the high precision power clamp shown in FIGS. 2 and 3, are designed to be utilized in machine tools having fluid pressure systems. However, when the use of fluid pressure is not feasible or available, the invention may be embodied in a structure which utilizes the principles of the invention but employs an electric motor for the source of power, as shown in the modification depicted in FIG. 4. In this modification, the bearing mounting ring 40 is provided with a reduced diameter lower portion 190 which serves as a locating seat for a cylindrical shell casing 191 secured thereto by screws 192. The bearing mounting ring 40, of FIG. 4, receives the pair of upper annular rows of bearing balls 47 and 48, and the lower annular bearing balls 52 which are preloaded by the clamp plunger 55. The plunger 55 receives the annular clamp plate 61 which is secured thereto by screws 62. The O-ring 63 and the retaining ring 64 are likewise provided to effectively prevent oil and dirt from entering into the bearing structure.

A T-bolt 193 having a flanged head 194 is disposed between the rails 28 and 29 and extends downwardly through the axially aligned openings 72 and 56 of the clamp plate 61 and the clamp plunger 55, respectively. The stem 196 of the T-bolt 193 has a reduced diameter portion 197 which is encircled by a coil compression spring 198. The upper end of the spring 198, as shown in FIG. 4, abuts a shoulder 201 formed by the reduced diameter portion 197 on the stem 196 of the T-bolt 193. The lower end of the spring 198 engages an annular flange 202 of an upper circular spring plate 203 which is secured to the bottom surface of the clamp plunger 55 by a plurality of cap screws 204, one of which is shown. The reduced diameter portion 197 of the stem 196 of the T-bolt 193 extends downwardly through an axial opening 207 provided in the upper spring plate 203 and receives a snap ring 208 which engages against the bottom surface of the flange 202 and serves to limit the amount that the T-bolt 193 can be moved upwardly by the action of the spring member 198. The spring 198 is confined between the shoulder 201 and the flange 202, under sufficient compression to normally urge the T-bolt 193 upwardly to provide a clearance space 210 between the flanges 209 and 211 of the T-bolt 193.

The extreme lower end of the stem 196 of the T-bolt 193 is provided with a threaded portion 212 which is in engagement with an elongated nut 213. Rotation of the nut 213 is effected by means of a nut drive shaft 214 integrally formed with the nut 213. The threads 212 and the threads in the nut 213 are such that the friction or resisting force developed therebetween are larger than the overhauling forces and thus the screw and nut arrangement is considered to be self locking. With the threads of the threaded portion 212 of the T-bolt 193 and the threads of the nut 213 being of the self locking type, the nut 213 must always be positively driven to effect its rotation. Thus, axial movement of the T-bolt 193 into or out of clamp rail engagement can never occur inadvertently, but is always dependent upon the nut 213 being positively driven. Intermediate the nut 213 and the drive shaft 214 there is provided a collar or flange portion 216, the upper surface of which is formed to provide an annular upwardly facing bearing thrust shoulder 217 on which roller pins 218 of a low friction contact pin bearing 219 are supported.

A lower circular spring plate 222 having an axial opening 223 is mounted about the circular nut 213 with the nut being free to rotate relative to the plate 222. The bottom surface of the lower spring plate 222 is provided with a downwardly facing annular thrust bearing surface 224 which is complementary to the thrust bearing surface 217 of the collar 216 and engages the pin bearing 219. Thus, the lower spring plate 222 is supported on the low friction pin bearing 219 which permits rotation of the shaft and nut structure relative to the lower spring plate 222.

As shown in FIG. 4, the bottom surface of the upper spring plate 203 and the upper surface of the lower spring plate 222 are provided with annular complementary recesses 226 and 227 respectively. A plurality of coiled compression springs 230, two of which are shown in FIG. 4, are disposed between the plates 203 and 222 with the ends thereof confined within the recesses 226 and 227. To insure that the lower spring plate 222 will not rotate with the nut 213 the spring plate 222, as shown in FIG. 5, is provided with a downwardly extending pin 213 which extends downwardly into a vertical pin receiving hole 232 formed in a radial extension 233 of an upwardly extending bearing boss 234 of a motor mounting casting 235.

To apply the clamping action the nut drive shaft 214 is rotated in a counterclockwise direction, as viewed in FIG. 4, to effect rotation of the nut 213 in the same direction. Rotation of the nut 213 in a counterclockwise direction will operate to draw the T-bolt 193 downwardly to further compress the spring 198 and engage the flanges 209 and 211 with the rails 28 and 29, respectively. When the flange head of the T-bolt 193 is firmly engaged with the rails 28 and 29 the T-bolt will no longer be free to move downwardly. Therefore, further counterclockwise rotation of the nut 213 will serve to move the nut upwardly relative to the screw 212. The upward movement of the nut 213 will effect upward movement of the lower spring plate 222 through the collar 216 and the pin bearing 219. As the lower spring plate 222 moves upwardly it will tend to additionally compress the springs 230 which thereupon act against the upper spring plate 203 urging it upwardly. Since the upper spring plate 203 is in engagement with the clamp plunger 55 it will be urged axially upwardly to engage the clamp plate 61 with the bottom surfaces of the clamp rails 28 and 29. Thus, two opposing immobilizing forces are applied to the rails 28 and 29, one by means of the T-bolt 193 and acting downwardly and the other by the clamp plate 61 and acting upwardly to thereby immobilize the movable member in its predetermined precise orientated position. The two opposing forces are operable to immobilize the movable member but cannot act upon the movable member to draw it downwardly upon the sensitive roller supporting structures 18 and 19, since both forces are of the same magnitude and counteract each other in their tendency to effect movement of the movable member. Therefore, additional forces which would tend to deform the sensitive roller supporting structures 18 and 19 are never imparted thereto by the clamp mechanism and the stability and accuracy of the machine tool system is not impaired by the operation of the clamp mechanism. Also, since the clamp plunger 55 is radially immovable relative to the supporting bed structure by reason of the preloaded bearings, the clamp mechanism can only operate to apply perpendicular forces to the movable member and thus cannot act to displace the movable member from its orientated position.

Rotation of the nut drive shaft 214 in either direction is effected by means of a reversible electric motor 240 secured to the motor mounting casting 235 by means of cap screws 241. The motor mounting casting 235 receives the opposite end of the casing 191 which is secured to it by means of screws (not shown). Thus, all of the operating parts of the clamp mechanism are sealed within the casing 191. The electric motor 240 is connected to rotate the nut drive shaft 214 through a gear transmission 242. To this end, the motor 240 has a drive shaft 243, the inwardly extending end of which receives a pinion 244 that is keyed thereto for rotation with it. The pinion 244 is in meshing engagement with a relatively large gear 246 keyed on an intermediate shaft 247, the upper end of which is journalled in a bearing support bracket 248 that extends upwardly from the motor mounting casting 235. The lower end of the intermediate shaft 247 is journalled in a suitable bearing boss (not shown) in a well known manner. A pinion 249 is mounted on the upper end of the intermediate shaft 247 and is keyed thereto so as to rotate with the shaft. The pinion 249 is in meshing engagement with a drive gear 251 connected to effect rotation of the nut drive shaft 214. The driving gear 251 is provided with an elongated hub 252 which is journalled in a pair of bearings 253 and 254 that are carried in the bearing boss 234. A snap ring 255 effectively locks the assembly in position on the boss 234. As shown in FIG. 4, the nut drive shaft 214 extends downwardly into the hub 252 of the drive gear 251 and is keyed thereto to establish a rotating drive therebetween but permitting the nut drive shaft 214 to move axially relative to the hub 252.

Operating control of the motor 240 is effected by a pair of switches 261 and 262, shown in FIG. 5, which are operated by a pin 263. The pin 263 is adjustably mounted in the lower spring plate 222 to move with it and is locked in position by means of a set screw 264, illustrated in FIG. 4. As shown in FIG. 5, the switch 261 is secured to the side of the bearing boss 234 and is disposed so that its actuating lever 266 is in position to be actuated by the downwardly extended end 267 of the pin 263. The switch 262 is mounted on a vertically adjustable switch mounting plate 268 which is secured to the boss 234 by a pair of screws 269 that are inserted through a pair of vertical slots 270 formed in the plate 268, and threadedly engaged in the boss 234. The switch 262 is also positioned so that its actuating lever 271 will be contacted by the end 267 of the pin 263. The arrangement is such that with the lower spring plate 222 in its lowermost position the end 267 of the pin 263 will be in position to actuate both levers 266 and 271 of the switches 261 and 262 respectively. The motor 240, when energized for rotation in a counterclockwise direction, will operate to effect upward movement of the lower spring plate 222 and the pin 263 will move with the plate. When the end 267 of the pin 263 is disengaged from the levers 271 and 266 of the switches 262 and 261 respectively, the switches will be released to their normal condition and the motor 240 will stop when the movable member is fully clamped. The release of both of the switches 261 and 262 not only stops the motor but also conditions the electrical circuit to the motor so that the motor can only be energized for rotation in the opposite direction in its next operation. The motor 240, when energized for operation in a clockwise direction, effects a return of the lower spring plate 222 to its lowermost position and thereby releases the immobilizing forces that are applied to the movable member by the clamp mechanism. As the plate 222 moves downwardly to its original position the pin 263 moves with it, re-engaging the end 267 thereof with the levers 266 and 271 of the switches 261 and 262 to stop the motor when the clamp is released and condition the electrical circuit so that the next operation of the motor will be in the counterclockwise direction.

The clamping mechanism may be adjusted to regulate the amount of clamping pressure that is applied to the rails 28 and 29 as well as to establish the unclamped position of the spring plate 222 to determine the compression of the springs 230 when the table is unclamped. The amount of clamping pressure that is applied to the rails 28 and 29 is regulated by adjusting the position of the pin 263 relative to the spring plate 222. If it is desired to increase the clamping pressure, the pin 263 is lowered relative to the plate 222 while the amount of clamping pressure may be reduced by raising the pin 263 relative to the spring plate 222. The position of the spring plate 222 when the clamping mechanism has been released is established by the adjustment of the switch 262 and it should be noted that when the pin 263 has been adjusted to change the clamping pressure, it will affect the unclamping position of the spring plate 222 so that the position of the switch 262 will have to be adjusted accordingly to compensate for this. The unclamped position of the spring plate 222 is important since it must be spaced far enough from the spring plate 203 to release the spring 230 sufficiently so that the spring 198 will shift the T bolt 193 upwardly and the plunger 55 downwardly to fully release the table 13.

Thus, it will be assumed that the switch 262 and the pin 263 are properly located so that the spring plate 222 will be spaced a sufficient distance from the spring plate 203 to release the clamping mechanism when the pin 263 engages the switch 262 to stop the operation of the motor 240. However, assuming that it is desired to increase the clamping pressure on the rails 28 and 29 the pin 263 will be moved downwardly relative to the spring plate 222. The downward movement of the pin 263 relative to the spring plate 222 will require that the spring plate 222 be moved upwardly an additional amount, equal to the downward adjustment of the pin 263, before the latter will release the switch 261 to stop the motor 240 in a clamping operation. As a result, when the motor 240 is stopped, the spring plate 222 will be closer to the spring plate 203 so that the springs 230 will be more fully compressed and the clamping pressure applied to the rails 28 and 29 will be increased accordingly.

Since the pin 263 extends downwardly an additional amount from the spring plate 222, it will engage the switch 262 sooner, before the spring plate 222 has reached the desired unclamping location to fully release the clamping mechanism from engagement with the rails 28 and 29 as it did before the pin 263 was shifted. Therefore, in order to compensate for this downward movement of the pin 263 to obtain the desired unclamping location of the spring plate 222, the switch 262 will be moved downwardly by an amount equal to the amount that the pin 263 was moved downwardly relative to the spring plate 222. When this is accomplished, the pin 263 will have to move downwardly a further amount to engage the switch 262 so that the proper unclamped location of the spring plate 222 will again have been obtained. If the clamping pressure on the rails 28 and 29 is reduced, the pin 263 will be moved upwardly relative to the spring plate 222 as previously described, and the switch 262 will then have to be shifted upwardly a like amount to compensate for this shifting of the pin 263 so that the spring plate 222 will be in the same position when the motor 240 is stopped in its unclamping operation.

To adjust the switch actuating pin 263 in the lower spring plate 222, the casing 191 is provided with a set screw access opening 276 which is normally closed by a threaded plug 277. By removing the plug 277 a tool, such as a screw driver, may be inserted through the opening 276 to loosen the threaded screw 264 and thereby release the pin 263 for the purpose of moving it relative to the spring plate 222. A pin access opening 278 is also provided in the casing 191 and is also normally closed by a threaded plug 279. Upon removal of the plug 279, a tool, such as a screw driver, can be inserted through the opening 278 and is engaged in an annular recess 280 provided on the pin 263 for the purpose of raising or lowering the pin as desired.

The fact that the clamping pressure is applied through the springs 230 rather than directly to the plunger 55 by the motor 240 provides several distinct advantages. For example, the clamping pressure may be regulated by means of the adjustments described above. Furthermore, in the absence of the springs 230 it will be necessary to stall the motor in applying the clamping pressure and as a result a relatively large torque motor would be required. In addition, if the springs 230 were omitted, the threads of the nut 213 would tighten on the thread 212 when the clamping pressure was applied to present the problem of releasing the threads when the direction of rotation of the nut 213 is reversed for releasing the clamping pressure.

The control circuit for energizing the motor 240 is shown in simplified schematic form in FIG. 6. As there shown, electrical power from a three phase source, represented as line conductors $L_1$, $L_2$ and $L_3$, is transmitted via the usual disconnect switch 281 to conductors 282, 283 and 284. A primary winding 272 of a transformer 285 is connected to receive power from the conductors 283 and 284, via conductors 273 and 274. The secondary winding 275 of the transformer 285 is connected to energize conductors 286 and 287 of a control circuit for the motor 240 at reduced voltge. Depressing a normally open push button "clamp" switch 288 completes a circuit from the energized conductor 286, through a conductor 289, the closed contact bar 290 of the button switch 288, a conductor 291 and a closed contact bar 292 of a latching relay 293. From the closed contact bar 292 of the latching relay 293, current will continue through a conductor 294, through a coil 296 of a counterclockwise motor start relay 297 and thence through a conductor 298 to the energized conductor 287. Energization of the motor start relay 297 operates to close line contact bars 298A, 299 and 301 of the relay to complete a power supply circuit from the line conductors $L_1$, $L_2$ and $L_3$ to the clamp motor 240 to energize it for operation in a counterclockwise direction. At the same time, a holding circuit to retain the relay 297 energized is completed via a conductor 302, a closed contact bar 303 of the relay 297, a shunt conductor 304, the closed contact bar 292 of the latching relay 293, the conductor 294, thence through the coil 296 of the relay 297 and the conductor 298 to the energized conductor 287.

With the relay 297 actuated, the motor 240 will operate to effect operation of the clamp mechanism for applying clamping forces to the movable member or table 13. When the clamp mechanism is operated in a clamping action the lower spring plate 222 will be caused to move upwardly carrying the switch actuating pin 263 with it. As the pin 263 moves upwardly the normally open unclamp limit switch 262 is released to open its contact bar 306 and interrupt a circuit from the energized conductor 286 to a conductor 307 connected to the coil 308 of a reset relay 309.

As schematically shown in FIG. 6, the plunger 311 of the latching relay 293 is mechanically connected to the plunger 312 of the reset relay 309 by means of a pivotal interconnecting lever 313. As shown, the plunger 311 of the latching relay 293 is in an "out" position relative to its coil while the plunger 312 of the reset relay 309 is in an "in" position relative to its coil 308. Thus, when the relay 293 is energized, the plunger 311 thereof will be moved to an "in" position relative to its coil, while the plunger 312 of the reset relay 309 will be moved to an "out" position relative to its coil 308 by reason of the mechanical connection between the two plungers 311 and 312 through the pivotal lever 313. In a reset operation, with the relay 293 de-energized, energization of the reset relay 309 will operate to position the plunger 312 to an "in" position relative to its associated coil 308 and by reason of the mechanical lever 313 will position the plunger 311 of the latch relay 293 to an "out" position relative to its associated coil.

As the motor continues to operate in a counterclockwise direction the upward movement of the switch actuating pin 263 will continue until the normally closed clamp limit switch 261 is released to close its contact bar 314. With the contact bar 314 closed a circuit will be completed from the energized conductor 286, a conductor 316, the closed contact bar 314 of the limit switch 261, a conductor 317, thence through a coil 318 of the latching relay 293 and a conductor 319 to the energized conductor 287. Energization of the latching relay 293 will operate to open its contact bar 292 thereby interrupting the power supply circuit to the motor 240 to stop operation of the motor by de-energizing the relay 297, which, when de-energized, operates to open the contact bars 298A, 299, 301 and 303 associated therewith. Energization of the latching relay 293 also operates to move a contact bar 321 of the relay to a closed position to establish an energizable circuit to a clockwise motor start relay 325. It will be noted that if the "clamp" button switch 288 is actuated at this time, the motor 240 will not be energized by reason of the open contact bar 292 in the circuit to the coil 296 of the counterclockwise motor start relay 297.

To operate the clamp mechanism in a releasing operation, a normally open unclamp push button switch 326 is depressed to complete a circuit from the energized conductor 286, through a conductor 327, the closed contact bar 328 of the push button switch 326, a conductor 329, the closed contact bar 321 of the latching relay 293, a conductor 331, thence through a coil 332 of the clockwise motor start relay 325 and a conductor 333 to the energized conductor 287. With the clockwise motor start relay 325 energized, line contact bars 334, 336 and 337 of the relay are moved upwardly to a closed position thereby completing a power supply circuit from the line conductors $L_1$, $L_2$ and $L_3$ to the motor 240 for operating the motor in a clockwise direction. At the same time, a holding circuit to retain the relay 325 closed is completed via a conductor 338, a closed contact bar 339 of the relay 325, a shunt conductor 341, the conductor 329, the now closed contact bar 321 of the energized latch relay 293, the conductor 331, thence through the coil 332 of the relay 325 and the conductor 333 to the energized conductor 287.

With the relay 325 energized the motor 240 will operate to effect a release operation of the clamp mechanism. When the clamp mechanism is operated in a releasing operation, the lower spring plate 222 will move downwardly carrying the switch actuating pin 263 with it. As the pin 263 moves downwardly it engages the actuating lever 266 of the switch 261 causing the contact bar 314 to open, thereby interrupting the circuit to the coil 318 of the relay 293 to de-energize the relay. As the motor 240 continues to operate in the clockwise direction the downward movement of the pin 263 will continue until the pin engages the actuating lever 271 of the unclamp limit switch 262 causing the contact bar 306 thereof to be moved to a closed position. At this time an energizing circuit to the coil 308 of the reset relay 309 will be established from the energized conductor 286 through the closed contact bar 306 of the unclamp limit switch 262, the conductor 307, the coil 308 of the reset relay 309 and thence via the conductor 319 to the energized conductor 287.

Energization of the reset relay 309 will operate to move the plunger 312 thereof to an "in" position and by reason of the mechanical connection between the plungers of the relays, will move the plunger 311 of the latching relay 293 to an "out" position. As the plunger 311 of the latch relay 293 is moved to an "out" position the closed contact bar 321 will be moved to an open condition to interrupt the energizing circuit to the clockwise motor start relay 325. When the clockwise motor start relay 325 is de-energized the contact bars 334, 336, 337 and 339 will move to open position thereby interrupting the power supply to the motor 240 stopping motor operation. In being moved to an "out" position the plunger 311 of the latching relay 293 will also serve to move the contact bar 292 thereof to a closed position to condition the clamp circuit for a subsequent operation for energizing the motor in a counterclockwise direction, and if the unclamp button switch 326 is inadvertently actuated, the motor cannot be energized for operation in a clockwise direction by reason of the open contact bar 321 in the circuit to the coil 332 of the clockwise motor start relay 325.

It is apparent from the foregoing description of the electrical circuit that the motor 240 can only be energized for alternate operations. That is, once the motor 240 has been energized for operation in one direction it cannot again be energized for operation in the same direction until it has been operated in a reverse direction. As a result, once the clamp mechanism has been operated to apply clamp forces to the movable member it cannot be operated in a clamping operation until it has operated to release the clamping forces applied. Thus, as in the case of the clamp mechanisms of FIGS. 2 and 3, the modified clamp mechanism of FIG. 4 can only operate to apply a predetermined selected force to the movable member. It is also apparent that in the modified version of the clamp mechanism of FIG. 4, the apparatus can only be operated to apply the selected force to the movable member or to release the clamping force from the movable member. It can never be operated to apply an intermediate clamping force to the movable member.

From the foregoing detailed description of the illustrative embodiments set forth herein to exemplify the present invention, it will be apparent that there has been provided an improved precision power clamp which is operative to apply predetermined clamping forces to a movable member, and which in operation does not impart to the movable member any forces which tend to displace the movable member from its orientated position. It is also apparent that the clamping forces applied by the apparatus of the present invention will not be transmitted to the supporting and guiding structure associated with the movable member to be clamped but will be distributed radially throughout the bed or base structure.

Although the exemplary embodiments of the invention have been described in considerable detail in order to fully disclose several forms of practical working apparatus incorporating the invention, it is to be understood that the particular structures shown and described are illustrative only, and that the various characteristics of the invention may be incorporated in other structural forms without departing from the spirit and scope of the invention as defined in the subjoined claims.

The principles of this invention having now been fully explained in connection with the foregoing description, I hereby claim as my invention:

1. In a clamping mechanism for clamping a member that is movably supported by a frame with the member having a longitudinal T slot formed in its underside; a clamping member carrier by the frame for axial movement with its upper surface operable to engage the underside of the member adjacent to the T slot in a clamping action; radially unyielding means rigidly interposed between said clamping member and the frame for continuously constraining said clamping member from radial movement to eliminate radial play between said clamping member and the frame without interfering with the axial movement of said clamping member relative to the frame; a T bolt having its head slidably contained in the T slot of the movable member and having its shank extending downwardly therefrom through an opening formed in said clamping member but being slidable axially relative to said clamping member and operable to engage the upper surfaces formed by the T slot on either side thereof in a clamping action in opposing relationship to said clamping member; actuating means operably connected to act upon said clamping member and said T bolt to move them axially in opposite directions to engage them in a clamping action with the movable member; and releasing means operable when actuated to act upon said actuating means to release said clamping member and said T bolt from clamping engagement with the movable member.

2. In a clamping mechanism for clamping a member that is movably mounted on a supporting surface of a frame with the member having a longitudinal slot formed in its underside; a pair of rails secured to the underside of the movable member, the inner edges of said rails being parallel to the slot and spaced apart but located beneath the slot so that the space between the inner edges of said rails extends longitudinally beneath the central portion of the slot to form a T slot; a clamping member carried by the frame for axial movement and said clamping member being located beneath the slot in the movable member with its upper surface in position to engage the underside of said rails in a clamping action when said clamping member is moved upwardly; laterally unyielding means rigidly interposed between said clamping member and the frame for continuously constraining said clamping member from lateral movement to eliminate the play between said clamping member and the frame without interfering with the axial movement of said clamping member relative to the frame; a T bolt having its head slidably contained in the T slot to be engageable with the upper surface of said rails and having its shank extending downwardly therefrom through the space between said rails and through an opening formed in said clamping member with the latter being slidable axially relative to said T bolt; and means operably connected to draw said T bolt downwardly to force its head into clamping engagement with the top surface of said rails with the reactionary force being applied to said clamping member to move said clamping member upwardly and force its upper surface into clamping engagement with the bottom surface of said rails; whereby opposing clamping forces of equal magnitude are applied to said rails to clamp the movable member relative to said frame without shifting the movable member relative to said frame.

3. In a clamping mechanism for clamping a member that is movably carried by a frame; a pair of opposed surfaces carried by the member, said opposed surfaces being adapted to receive the clamping pressure for clamping the movable member in a desired position; a first clamping member carried by the frame for movement into and out of clamping engagement with the first of said opposed surfaces, laterally unyielding means rigidly interposed between said first clamping member and the frame for continuously restraining said clamping member from lateral movement to eliminate the play between said clamping member and the frame during both the clamping action and the releasing action without interfering with its clamping and releasing movements; a second clamping member carried by the frame for movement into and out of clamping engagement with the second of said opposed surfaces; and means operably connected to move said second clamping member into engagement with the second of said opposed surfaces to develop a reactionary force that is applied to said first clamping member for forcing said first clamping member in the opposite direction into engagement with said first opposed surface as that opposed forces are applied to said opposed surfaces by said clamping members which are carried by the frame to lock the movable member in the established position relative to the frame; whereby the movable member is securely clamped in the desired position on the frame and the clamping mechanism avoids the development of forces which would draw the movable member against the frame but retains the movable member in the precise position on the frame as established before the clamping force is applied.

4. A clamping mechanism according to claim 3 wherein said laterally unyielding means comprises an axially deflectable diaphragm rigidly secured to the frame so that it is constrained from lateral movement relative to the frame and said first clamping member is secured to said diaphragm for axial movement with the deflection of said diaphragm into and out of clamping engagement with the first of said opposed surfaces.

5. A clamping mechanism according to claim 4, including a cylinder secured to said diaphragm, said first clamping member being secured to said cylinder; a piston reciprocally supported within said cylinder, said second clamping member being connected to be actuated by the reciprocal movement of said piston; resilient means urging said piston in a direction for actuating said second clamping member into clamping engagement with said second clamping surface which produces the reactionary force in said cylinder to shift the cylinder and its associated first clamping member in the opposite direction to thereby move said first clamping member into clamping engagement with said first surface for clamping the movable member in position; a source of hydraulic pressure; and means connected to selectively direct the hydraulic pressure from said source to said cylinder to actuate said piston against the force of said resilient means for releasing said clamping members from clamping engagement with their cooperating surfaces.

6. A clamping mechanism according to claim 3 wherein said means for moving said clamping member comprises; a threaded portion on said second clamping member; a nut in threaded engagement with said threaded portion, said nut being arranged to act against said first clamping member so that as said nut is rotated in a clamping direction it urges said second clamping member into clamping engagement with its cooperating surface to develop the reactionary force which is applied to force said first clamping member in the opposite direction into clamping engagement with its cooperating surface; whereby opposed forces are applied to said opposed surfaces by said clamping members to lock the movable member in the desired position relative to the frame.

7. A clamping mechanism according to claim 6 wherein resilient means are interposed between said nut and said first clamping member so that the reactionary force is transmitted from said nut to said first clamping member through said resilient means whereby a uniform clamping pressure is applied to said opposed surfaces.

8. In a machine tool having a member disposed for movement on a supporting structure, the member being provided with a pair of longitudinally extending clamp rails presenting opposing surfaces; a pair of concentrically disposed axially movable clamping members carried by the supporting structure, each of said clamping members having a clamping surface, said two clamping surfaces being movable in opposite directions to engage said opposing surfaces of the clamp rails; means secured to the supporting structure and operable to constantly restrain said clamping members from moving laterally relative to the supporting structure but permitting said clamping members to move axially; resilient means connected to actuate said clamping members to move them axially in opposite directions into clamping engagement with the opposite surfaces on the clamp rails of the movable member to immobilize the movable member by applying equal opposing forces to the clamp rails; and means operable when actuated to overcome the force of said resilient means to effect a release of said clamping members from clamping engagement with the clamp rails of the movable member.

9. In a clamping mechanism for clamping a member that is movably mounted on a supporting surface of a frame with the member having a longitudinal slot formed in its underside; a pair of rails secured to the underside of the movable member, the inner edges of said rails being parallel to the slot and spaced apart but located beneath the slot so that the space between the inner edges of said rails extends longitudinally beneath the central portion of the slot to form a T slot; a clamping member carried by the frame for axial movement but constantly restrained from lateral movement relative to the frame, said clamping member being located beneath the slot in the movable member with its upper surface in position to engage the underside of said rails in a clamping action when said clamping member is moved upwardly; a T bolt having its head slidably contained in the T slot to be engageable with the upper surface of said rails and having its shank extending downwardly therefrom through the space between said rails and through an opening formed in said clamping member with the latter being slidable axially relative to said T bolt; a cylinder depending axially from said clamping member; a piston slidably contained in said cylinder and attached to the extending end of said T bolt; a spring in said cylinder with one end bearing against the upper end of said cylinder and its opposite end bearing against said piston to yieldably urge said piston downwardly to draw said T bolt downwardly to force its head into clamping engagement with the top surface of said rails so that the reactionary force urges said cylinder and its associated clamping member upwardly and forces the upper surface of said clamping member into clamping engagement with the bottom surface of said rails so that said rails are securely held between the head of said T bolt and said clamping member to clamp the movable member relative to the frame; and a source of hydraulic power connected to be directed to said cylinder selectively for shifting said piston upwardly for releasing the clamping forces applied to said rails by said T bolt and said clamping member.

10. In a clamping mechanism for clamping a member that is movably supported by a frame; a pair of opposed surfaces carried by the member, said opposed surfaces being adapted to receive the clamping pressure for clamping the movable member in a desired position; a clamping plunger carried by said frame for axial movement into clamping engagement with the first of said opposed surfaces; a plurality of antifriction bearings interposed between said clamping plunger and said frame to support said clamping plunger for its axial movement relative to said frame, said antifriction bearings being preloaded to render them unyielding radially so that said clamping plunger is rigidly constrained from lateral movement for eliminating its radial play relative to the frame while remaining freely movable axially; a second clamping member carried by the frame for movement into clamping engagement with the second of said opposed surfaces; and means operably connected to move said second clamping member into engagement with the second of said opposed surfaces to develop a reactionary force that is applied to said first clamping member for forcing said first clamping member in the opposite direction into engagement with said first opposed surface so that opposed forces are applied to said opposed surfaces by said clamping members which are carried by the frame to lock the movable member in the established position relative to the frame; whereby the movable member is securely clamped in the precise desired position on the frame since said preloaded bearings prevent lateral shifting of said clamping members to avoid any tendency to displace the movable member.

11. In a precision clamping mechanism for a member disposed for movement on a supporting structure having a bore the axis of which is in a plane perpendicular to the plane in which the movable member is supported, said movable member having a pair of oppositely disposed clamping surfaces; a bearing member fixedly secured in axial alignment within the bore of the supporting structure; a clamping plunger having an axial bore supported within said bearing member and disposed therein in a manner to radially preload said bearing member to effect maximum radial rigidity of said bearing member and said clamping plunger relative to the supporting structure, said clamping plunger being disposed in position to be engageable with the first of said clamping surfaces when moved axially in one direction; a clamp bolt passing through the bore provided in said clamping plunger in axial alignment therewith and engageable with the second of said clamping surfaces in opposing relationship to said clamping plunger; a cylinder secured to said clamping plunger; a piston reciprocally supported in said cylinder; means to adjustably couple said clamp bolt and said piston together; resilient means in said cylinder disposed to act upon the end of the cylinder adjacent to said clamping plunger and upon said piston; a source of fluid pressure; a fluid circuit connected to said source of fluid pressure and to said cylinder at the free end thereof; a direction valve in said circuit and operable when actuated to direct fluid pressure to said cylinder to actuate said piston and said cylinder in opposition to the action of said resilient means; and control means operably connected to actuate said direction valve; whereby said clamping plunger and said clamp bolt may be moved axially in opposite directions into immobilizing engagement with the clamping surface of the movable member by operation of said resilient means acting simultaneously upon said cylinder and said piston and said direction valve may be actuated to direct fluid pressure to said cylinder to act upon said piston and cylinder to overcome the operation of said resilient means to release said clamping plunger and said clamp bolt from clamping engagement with the movable member.

12. In a clamping mechanism for immobilizing a member disposed for movement on a supporting structure; a clamping member carried by the movable member; a bearing support member rigidly secured to the supporting structure; a plurality of annular rows of bearings in said bearing support; a clamping plunger disposed in said bearing support for axial movement in a manner to preload the bearings of said annular rows of bearings in said bearing support to maintain said clamping plunger laterally immovable in any direction but permitting axial movement of said clamping plunger, said clamping plunger having an axial bore and provided with a substantial clamping surface engageable with said clamping member; a clamp bolt passing through the bore of said clamping plunger, said clamp bolt having an axial bore and provided with a clamping member engaging portion; a cylinder secured to said clamping plunger and adapted to receive the end of said clamp bolt extending through the bore of said clamping plunger; a piston reciprocally supported within said cylinder for effecting axial movement of said clamp bolt into and out of clamping engagement with the movable member; a tie bolt connected to said clamp bolt and passing through the bore of said clamp bolt, said tie bolt being adjustably connected to said piston to couple said piston to said clamp bolt for effecting axial movement of said clamp bolt with said piston, said tie bolt also being selectively operable to adjust the position of said piston within said cylinder; a Belleville spring member disposed within said cylinder in position to exert a force upon said cylinder and said piston to effect relative movement between them in opposite directions and thereby effect a like movement of said clamping plunger and said clamp bolt to actuate them axially into opposing clamping engagement with said clamping member to immobilize the movable member with the immobilizing forces being distributed laterally in all directions through the supporting structure through the preloaded bearing support to avoid forcing the movable member against its supporting structure; and means connected to supply fluid at predetermined pressure to said cylinder to act upon said piston and cylinder to overcome said Belleville spring member and thereby effect a release of said clamping plunger and said clamp bolt from clamping engagement with the movable member; whereby said clamping plunger and said clamp bolt are normally impelled to impart opposing clamping forces to the movable member by the operation of said Belleville spring member and the immobilizing force may be regulated by adjusting the position of said piston within said cylinder through the adjustment of said tie bolt.

13. In a precision clamping mechanism for immobilizing a member movably disposed on a supporting structure; a bearing mounting ring fixedly secured to the supporting structure; a plurality of annular rows of bearings carried in said mounting ring; a clamping plunger having an axial bore supported within said mounting ring in engagement with said annular rows of bearings in a manner to preload said bearings so that said clamping plunger may be moved axially relative to said mounting ring to be moved into engagement with the movable member but is constrained from lateral movement relative to said mounting ring; a clamping bolt having an axial bore extending through the bore of said clamping plunger, said clamping bolt having a flanged head positioned to be engageable with the movable member in opposing relationship to said clamping plunger; a tie bolt coupled to said clamping bolt and disposed within the bore of said clamping bolt with one end extending outwardly thereof; a closed cylinder having an axial opening in one end thereof, said cylinder being secured to said clamping plunger in position to receive the extending end of said clamping bolt in the opening provided in the end of said cylinder; a piston reciprocally supported within said cylinder and adjustably secured to the extending end of said tie bolt; resilient means disposed within said cylinder in engagement with an end of said cylinder and said piston to exert a force on said cylinder and said piston for effecting relative movement therebetween to actuate said clamping plunger axially into engagement with the movable member by reason of the interconnection between said cylinder and said clamping plunger and actuate said piston and its associated clamping bolt axially in the opposite direction to engage the flanged head of said clamping bolt with the movable member in opposing relationship to said clamping plunger by reason of the interconnection between said piston and said clamping bolt; and a source of fluid pressure connected to supply fluid pressure to the interior of said cylinder to act upon said piston and said cylinder to effect a release of said clamping plunger and said clamping bolt from clamping engagement with the movable member.

14. In a clamping mechanism for clamping a member that is movably supported on a supporting structure; a bearing mounting ring rigidly secured to the supporting structure; a plurality of annular rows of bearings carried in said mounting ring; a clamping plunger supported within said mounting ring in engagement with said annular rows of bearings in a manner to preload said bearings so that said clamping plunger may be moved axially relative to said mounting ring to be moved into engagement with the movable member but is constrained from lateral movement relative to said mounting ring, said clamping plunger being provided with an axial bore; a clamping bolt having an axial bore disposed in the bore of said clamping plunger and extending therethrough, said clamping bolt having a flanged head positioned to be engageable with the movable member in opposing relationship to said clamping plunger; a tie bolt disposed in the bore of said clamping bolt and coupled to it with one end thereof extending outwardly of the bore; a closed cylinder having an axial opening in one end thereof secured to said clamping plunger in position to receive the extending end of said clamping bolt in the axial opening provided in the end of said cylinder; a piston movably supported in said cylinder and adjustably coupled to the extending end of said tie bolt; resilient means disposed within said cylinder in engagement with an end of said cylinder and said piston to exert a force upon said cylinder and said piston for effecting relative movement therebetween to actuate said clamping plunger axially into engagement with the movable member by reason of the interconnection between said cylinder and said clamping plunger and to actuate said piston and its associated clamping bolt axially in the opposite direction to engage the flanged head of said clamping bolt with the movable member in opposing relationship to said clamping plunger by reason of the interconnection between said piston and said clamping bolt; an axially movable piston actuating plunger supported in the free end of said cylinder in position to engage said piston, said piston actuating plunger being operable when actuated into piston engagement to move said piston axially against the action of said resilient means to overcome the action of said resilient means to thereby effect a release of said clamping plunger and said clamping bolt from clamping engagement with the movable member; and means operably connected to actuate said piston actuating plunger axially into engagement with said piston.

15. In a machine tool having a movable member disposed for movement on a supporting structure; a first clamping element carried by the supporting structure for axial movement into and out of engagement with the movable member in a clamping and unclamping action; means operatively connected for continouusly constraining said clamping element from lateral movement relative to the supporting structure without interfering with its axial movement; a second clamping element carried by the supporting structure for axial movement into and out of engagement with the movable member in a clamping action in cooperation with said first clamping element to clamp the movable member between them; resilient means operatively connected to actuate both of said clamping elements into clamping engagement with the movable member to clamp it to the supporting structure; and power operated means selectively operable to overcome the action of said resilient means for actuating said clamping elements out of engagement with the movable member to release it for movement along the supporting structure.

16. In a clamping mechanism for clamping a movable member to its supporting structure; a first clamping element movably mounted in the supporting structure; a bearing interposed between said clamping element and the supporting structure for supporting said clamping element for axial movement in a plane perpendicular to the plane of movement of the movable member in position to be moved into and out of engagement with the movable member, said bearing being preloaded to constrain said clamping element from lateral movement relative to the supporting structure; a second clamping element supported for movement in a direction to cooperate with said first clamping element for clamping the movable member between them; resilient means operatively connected to urge said clamping elements toward each other for clamping the movable member between them; and releasing means selectively operable to oppose the force developed by said resilient means for releasing the movable member.

References Cited in the file of this patent

UNITED STATES PATENTS

| | | |
|---|---|---|
| 718,514 | Parker | Jan. 13, 1903 |
| 1,316,142 | Cleveland | Sept. 16, 1919 |
| 2,291,665 | Turrettini | Aug. 4, 1942 |
| 2,635,324 | Berthiez | Apr. 21, 1953 |

FOREIGN PATENTS

| | | |
|---|---|---|
| 533,406 | Germany | Sept. 17, 1931 |